(12) United States Patent
Fukuda et al.

(10) Patent No.: US 9,129,635 B2
(45) Date of Patent: Sep. 8, 2015

(54) MAGNETIC RECORDING MEDIUM WITH CONTROLLED ANISOTROPIC FIELDS AND MAGNETIC MEMORY DEVICE

(71) Applicant: HITACHI, LTD., Tokyo (JP)

(72) Inventors: Hiroshi Fukuda, Tokyo (JP); Yoshihiro Shiroishi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 112 days.

(21) Appl. No.: 13/799,078

(22) Filed: Mar. 13, 2013

(65) Prior Publication Data

US 2013/0286505 A1 Oct. 31, 2013

(30) Foreign Application Priority Data

Apr. 27, 2012 (JP) ................................ 2012-102100

(51) Int. Cl.
| | |
|---|---|
| G11B 5/127 | (2006.01) |
| G11B 5/66 | (2006.01) |
| G11B 5/78 | (2006.01) |
| G11B 5/00 | (2006.01) |

(52) U.S. Cl.
CPC .. *G11B 5/78* (2013.01); *G11B 5/66* (2013.01); *G11B 2005/0024* (2013.01)

(58) Field of Classification Search
None
See application file for complete search history.

(56) References Cited

U.S. PATENT DOCUMENTS

| 6,183,893 | B1 | 2/2001 | Futamoto et al. | |
|---|---|---|---|---|
| 8,163,405 | B2 * | 4/2012 | Hauet et al. | 428/828.1 |
| 8,460,805 | B1 * | 6/2013 | Gao et al. | 428/828.1 |
| 8,658,292 | B1 * | 2/2014 | Mallary et al. | 428/828 |
| 2012/0147718 | A1 * | 6/2012 | Hellwig et al. | 369/13.33 |
| 2012/0225325 | A1 * | 9/2012 | Nemoto et al. | 428/829 |

FOREIGN PATENT DOCUMENTS

| JP | 07-244801 A | 9/1995 |
|---|---|---|
| JP | 11-296833 A | 10/1999 |
| JP | 2000-113442 A | 4/2000 |

OTHER PUBLICATIONS

Shiroishi et al., "Future Options for HDD Storage", IEEE Transactions on Magnetics, 2009, pp. 3816-3822, vol. 45, No. 10.
Zhu et al., "Bias-Field-Free Microwave Oscillator Driven by Perpendicularly Polarized Spin Current", IEEE Transactions on Magnetics, 2006, pp. 2670-2672, vol. 42, No. 10.
Zhu et al., "Microwave Assisted Magnetic Recording", IEEE Transactions on Magnetics, 2008, pp. 125-131, vol. 44, No. 1.
Batra et al., "Role of Media Parameters in Switching Granular Perpendicular Media Using Microwave Assisted Magnetic Recording", IEEE Transactions on Magnetics, 2009, pp. 889-892, vol. 45, No. 2.
Scholz et al., "Micronnagnetic modeling of ferromagnetic resonance assisted switching", Journal of Applied Physics, 2008, p. 103, 07F539.
Victora et al., "Composite Media for Perpendicular Magnetic Recording", IEEE Transactions on Magnetics, 2005, pp. 537-542, vol. 41, No. 2.

* cited by examiner

*Primary Examiner* — Kevin Bernatz
(74) *Attorney, Agent, or Firm* — Mattingly & Malur, PC

(57) ABSTRACT

There are provided a magnetic recording medium and a magnetic memory device capable of implementing high recording density, in the case of using a microwave assisted magnetic recording (MAMR) scheme. In a magnetic memory device including a magnetic recording medium having a recording film with three or more layers, a recording magnetic pole generating a recording magnetic field, an opposed magnetic pole, a high frequency magnetic field generating element generating a microwave for recording assist, and a magnetic reproduction element, an anisotropic field of a first layer which is a top layer of the recording film is larger than 20 kOe.

5 Claims, 10 Drawing Sheets

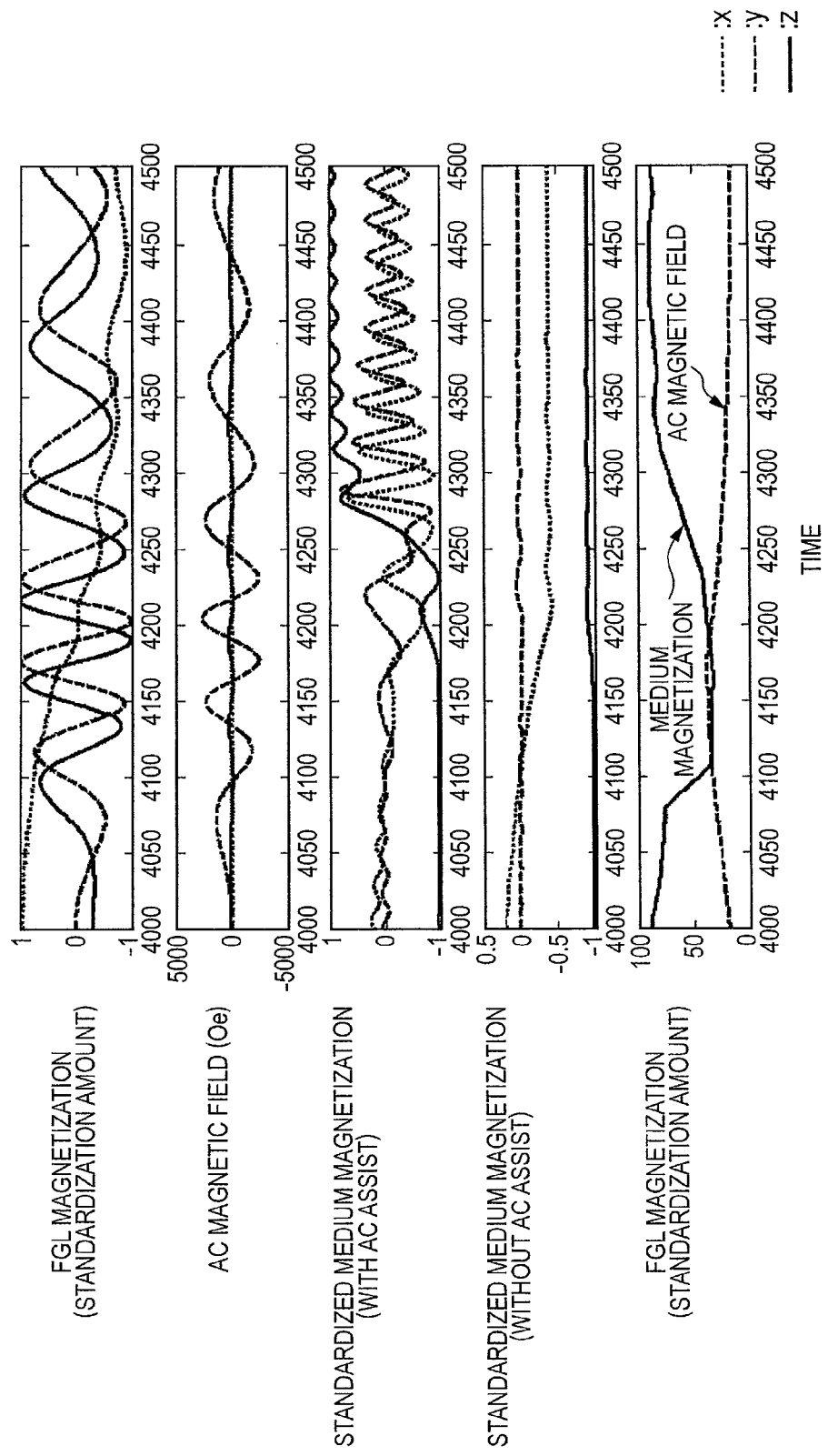

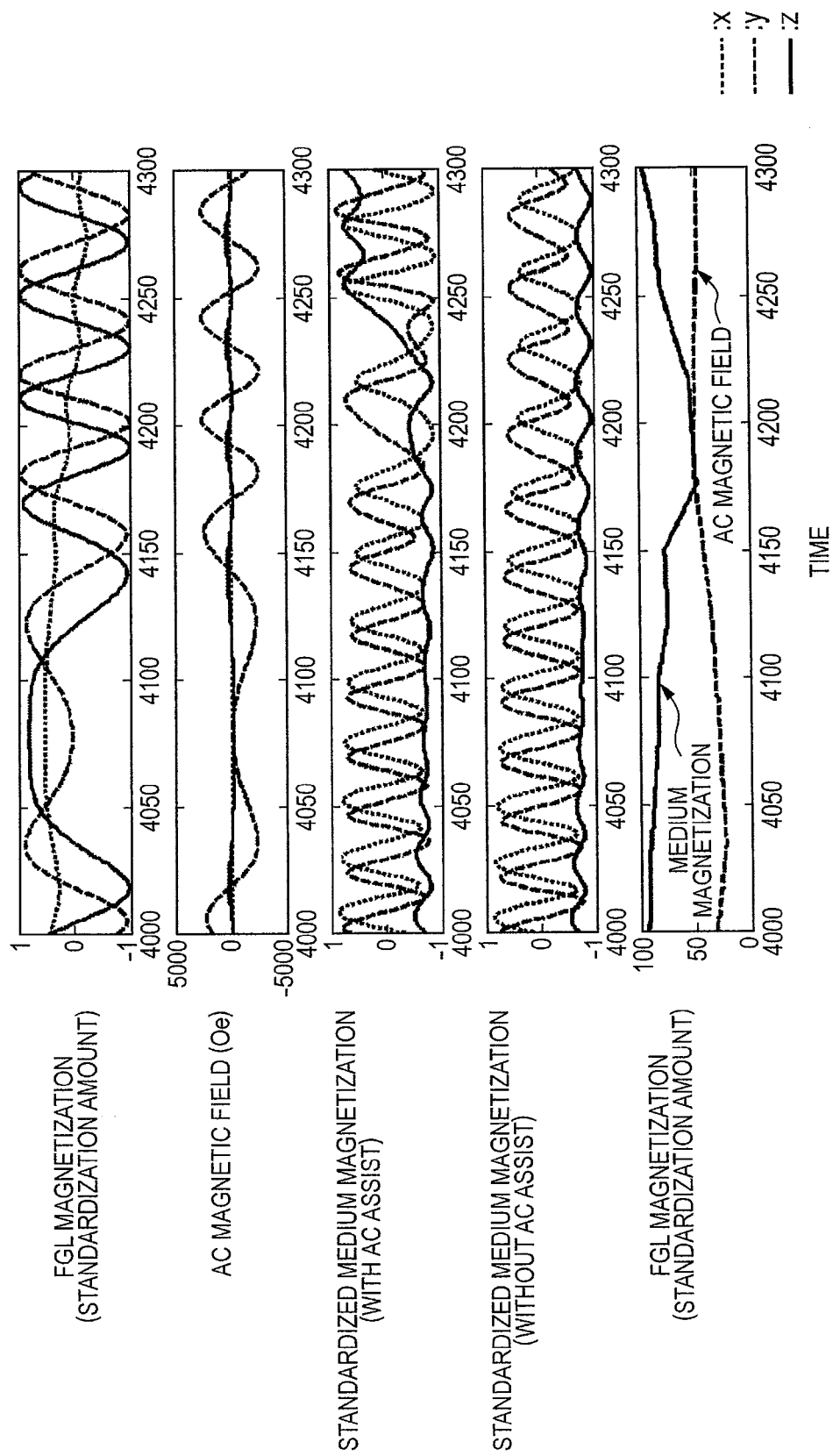

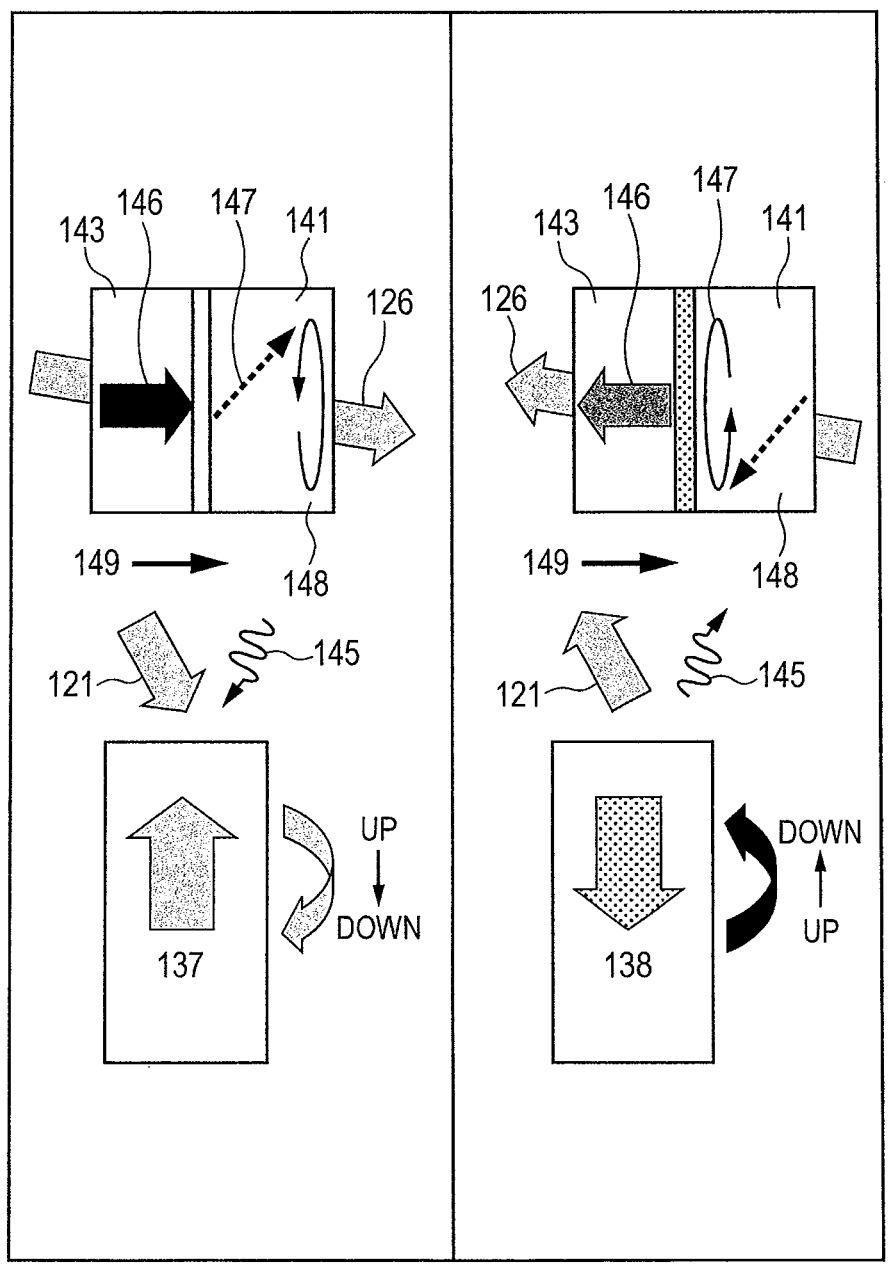

MAGNETIC RECORDING MEDIUM WITH CONTROLLED ANISOTROPIC FIELDS AND MAGNETIC MEMORY DEVICE

CLAIM OF PRIORITY

The present application claims priority from Japanese patent application JP 2012-102100 filed on Apr. 27, 2012 the content of which is hereby incorporated by reference into this application.

FIELD OF THE INVENTION

The present invention relates to a magnetic recording medium and a magnetic memory device including the same.

BACKGROUND OF THE INVENTION

On the contrary, Japanese Patent Application Laid-Open (JP-A) No. Hei7 (1995)-244801 (Patent Document 1) discloses a spin heating recording method in which a high frequency magnetic field satisfying a magnetic resonance condition is supplied to a magnetic recording medium by following a high frequency source provided at the outside by a motion of the magnetic head and a spin of the magnetic recording medium absorbs energy of the high frequency magnetic field, and as a result, writing may be performed even on a coercive magnetic recording medium in a low magnetic field without actually increasing a temperature of the magnetic recording medium by using coercive force which effectively deteriorates.

Recently, X. Zhu and J-G. Zhu, "Bias-Field-Free Microwave Oscillator Driven by Perpendicularly Polarized Spin Current" IEEE Trans. Magn., vol. 42, pp. 2670-2672, 2006 (Non-Patent Document 2) discloses a spin torque high frequency oscillator (STO) which has a practical minute structure using a high frequency field generation layer (FGL) generating a high frequency magnetic field by high-speed rotation by spin torque. J-G. Zhu, X. Zhu, and Y. Tang, "Microwave Assisted Magnetic Recording", IEEE Trans. Magn., Vol. 44, no. 1, PP125-131 (2008) (Non-Patent Document 3) discloses a microwave assisted magnetic recording (MAMR) scheme in which the spin torque oscillator (STO) having the same structure is adjacent to a main magnetic pole of the vertical magnetic head and a switching magnetic field is decreased by exciting precession of medium magnetization in a high frequency magnetic field in a microwave band from the STO, and information is magnetically recorded on a magnetic recording medium having large magnetic anisotropy to thereby achieve high density.

Further, S. Batra and W. Scholz, "Role of Media Parameters in Switching Granular Perpendicular Media Using Microwave Assisted Magnetic Recording", IEEE Trans. Magn., Vol. 45, PP889-892 (2009) (Non-Patent Document 4) and S. Batra and W. Scholz, "Micromagnetic modeling of ferromagnetic resonance assisted Switching", J. App. Phys., 103, 07F539 (2008) (Non-Patent Document 5) disclose a relationship between various design conditions of the microwave assisted magnetic recording scheme and effects thereof. By the Non-Patent Documents 4 and 5, recently, research and development for commercialization of the microwave assisted magnetic recording scheme have been rapidly accelerated.

Meanwhile, as a commercialized scheme in advance as a method of increasing recording density of the vertical magnetic recording, a multilayered medium such as an exchange coupled composite (ECC) medium and a CAP medium is included. For example, the multilayered medium is disclosed in R. H. Victora and X. Shen, "Composite Media for Perpendicular Magnetic Recording", IEEE. Trans. Magn. vol. 41, PP. 537-542 (2005) (Non-Patent Document 6). Further, with respect to a multilayered medium for obtaining a different effect from the ECC effect disclosed in the Non-Patent Document 6, for example, the multilayered medium in which a high Ku layer is provided on a surface of the recording film or a ground interface in order to suppress noise due to a reverse magnetic domain generated from a low Ku area where the surface of the recording film or the ground interface is local is disclosed in Japanese Patent Application Laid-Open (JP-A) No. Hei11(1999)-296833 (Patent Document 2) and Japanese Patent Application Laid-Open (JP-A) No. 2000-113442 (Patent Document 3).

SUMMARY OF THE INVENTION

The microwave assisted magnetic recording (MAMR) scheme using a spin torque oscillator (STO) is considered as being useful for high recording density because a reduction in size of the magnetic head is possible as compared with a heat assisted scheme in the related art. Accordingly, the inventors study and test a magnetic memory device mounted with a high frequency generation element under the same various environmental conditions as the known device, and as a result, it is confirmed that there is the following large problem for commercialization.

As described above, the crystal grain of the magnetic recording medium needs to be decreased for increasing recording density, but in this case, in order to acquire recording stability for a long time, magnetic anisotropic energy (Ku×V) per crystal grain needs to be sufficiently larger than heat disturbance energy (k×T). Here, Ku is magnetic anisotropic energy of the magnetic recording medium (energy for reversing magnetization direction per unit volume=saturated magnetization Ms×anisotropic field Hk/2), V is a volume of the crystal grain, k is Boltzmann's constant, and T is an absolute temperature. The ECC medium has a main object to increase recording density by reversing magnetization of the magnetic recording medium having large Ku by a predetermined (or smaller) head magnetic field. Meanwhile, the MAMR is for obtaining the same effect. However, from the discussion result of the inventors, it is found that it is difficult to obtain an increasing effect of the MAMR and the ECC medium even if the MAMR is applied to the known ECC medium. That is, it is not necessarily obvious whether there is a possibility that the MAMR further improves density limitation of the vertical magnetic recording in the related art by an advantage of the MAMR for the ECC medium or the increasing effect of the MAMR and the ECC.

Further, the optimal magnetic recording medium does not singly exist and in order to derive the performance, an optimal design of the entire recording device is required, but the configuration condition is not necessarily clear. Particularly, in order to emphasize characteristics of the MAMR, information is not recorded on the magnetic recording medium by only the recording magnetic field from the main magnetic pole, but the information may be recorded by reversing the magnetization of the magnetic recording medium only in an area where the high frequency magnetic field is applied to the recording magnetic field from the high frequency field generation layer FGL (selective reversal by a microwave). In this case, since the recording width is defined by a width of the FGL, sufficiently large recording magnetization may be obtained without reducing the recording magnetic field by a narrowed width of the magnetic pole by using the main magnetic pole having a wide width. Further, the condition needs to be implementable in a physical property and a configuration of an available material. For example, since an oscillation frequency of the spin torque oscillator depends on the configuration (a magnetic property and a structure), the oscillation frequency is limited in an actual configuration.

However, those objects are not disclosed in the prior technical documents, and particularly, in the Non-Patent Documents 2 to 5, how much the recording density is actually improved by the microwave assisted magnetic recording scheme using a spin torque effect due to spin injection is not quantitatively discussed, and the problems are not disclosed.

The present invention has been made in an effort to provide a magnetic recording medium and a magnetic memory device capable of implementing high recording density, in the case of using a microwave assisted magnetic recording (MAMR) scheme.

In order to solve the problems, for example, configurations disclosed in claims are adopted.

The present invention includes a plurality of means for solving the above problems, and an embodiment of the present invention provides a magnetic memory device, including: a magnetic recording medium with a recording film having three or more layers in which information is recorded; and a magnetic head including a recording magnetic pole generating a recording magnetic field for writing information in the magnetic recording medium, an opposed magnetic pole provided facing the recoding magnetic pole, a high frequency magnetic field generating element provided between the recoding magnetic pole and the opposed magnetic pole, and a magnetic reproduction element reading information from the magnetic recording medium, in which an anisotropic field of a first layer which is the closest to the magnetic head in the recording film of the magnetic recording medium is larger than 20 kOe.

Further, another embodiment of the present invention provides a magnetic recording medium used in a microwave assisted magnetic recording scheme magnetic memory device, including a recording film with three or more layers in which information is recorded, in which an anisotropic field of a first layer of the recoding film which is the closest to a magnetic head of the magnetic memory device as the recording film is larger than 20 kOe.

According to the present invention, it is possible to provide a magnetic recording medium and a magnetic memory device capable of implementing high recording density, in the case of using a microwave assisted magnetic recording (MAMR) scheme.

BRIEF DESCRIPTION OF THE DRAWINGS

FIG. 5A is a characteristic diagram (type-1) for describing a principle of the present invention and a diagram illustrating changes with time of an AC magnetic field and medium magnetization before and after magnetization reversal;

FIG. 5B is a characteristic diagram (type-2) for describing a principle of the present invention and a diagram illustrating changes with time of an AC magnetic field and medium magnetization before and after magnetization reversal;

FIGS. 13A and 13B are schematic diagrams for describing an operational principle of the magnetic memory device according to the first embodiment of the present invention, in which FIG. 13A illustrates a case where upward magnetization is rewritten downward, and FIG. 13B illustrates a case where downward magnetization is rewritten upward.

DETAILED DESCRIPTION OF THE PREFERRED EMBODIMENTS

Figure 1:
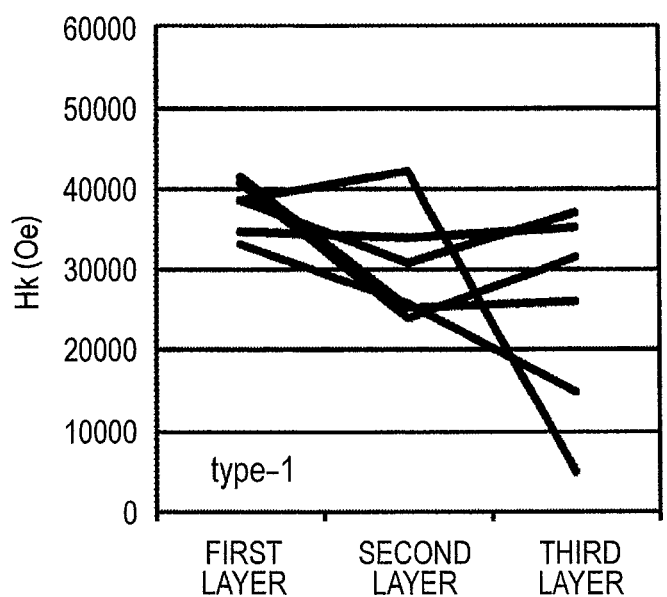
FIG. 1 is a characteristic diagram illustrating a configuration of a typical anisotropic field of a magnetic recording medium (type-1, three layers) according to an embodiment of the present invention.

As a result of discussing a means for achieving the object, inventors found that in a multilayered recording medium, a magnetic recording medium and a magnetic memory device includes a layer in which an anisotropic field Hk of a first layer which is the closest to a magnetic head is larger than 20 kOe. In particular, inventors found that as the magnetic memory device, in a position of the magnetic recording medium (particularly, multilayered recording layer) where information is recorded, when an intensity of the recording magnetic field is Hdc, an angle between the recording magnetic field and a magnetic anisotropic easy axis of the magnetic recording medium is $\phi$, an intensity of the high frequency magnetic field is Hac, a frequency of the high frequency magnetic field is fac, and a damping coefficient of each layer of the magnetic recording medium (particularly, multilayered recording layer) is $\alpha$, and an average value of anisotropic fields of the magnetic recording medium is Hk, Hk<3·Hdc when $\alpha$>0.1, fac<40 GHz, and $\phi$<30° or $\phi$>60°, and 2·Hdc<Hk<3·Hdc when $\alpha$>0.1, fac<40 GHz, and 30°<$\phi$<60°. The present invention has been completed based on these new findings.

An embodiment will be described below. A magnetic memory device includes a magnetic recording medium with a magnetic material film having three or more layers which records information; and a magnetic head at least including a recording magnetic pole generating a recording magnetic field for writing information in the magnetic recording medium, an opposed magnetic pole facing the recoding magnetic pole, a high frequency magnetic field generating element provided between the recoding magnetic pole and the opposed magnetic pole, and a magnetic reproduction element reading information from the magnetic recording medium, in which an anisotropic field of a first layer which is the closest to the magnetic head formed by the magnetic material film having three or more layers is larger than 20 kOe. Here, the magnetic recording medium may not sufficiently record the information by only the recording magnetic field from the recording magnetic pole. The anisotropic field of the first layer of the magnetic material film having three or more layers may be larger than an anisotropic field of a second layer which is adjacent to the first layer to be opposite to the magnetic head.

As described below, in an MAMR, first, magnetization of the magnetic recording medium is forcibly vibrated by an AC magnetic field, and as a result, a magnetization direction is close to an in-plane direction of the magnetic recording medium, and thereafter, the magnetization is reversed by receiving torque in a magnetization reversal direction from an in-plane component of the magnetic recording medium of an effective magnetic field which is perpendicular to the magnetization direction. As a result, the magnetization reversal may be achieved even in a magnetic recording medium having a relatively large anisotropic field Hk (that is, high thermal stability). Since the AC magnetic field is rapidly reduced in a film thickness direction of the magnetic recording medium, the reversible Hk is reduced in the film thickness direction. Accordingly, the Hk is decreased in the film thickness direction in accordance with the reduction of the AC magnetic field in the film thickness direction of the magnetic recording medium, and as a result, in order to reverse the magnetization of the magnetic recording medium having high anisotropy (that is, high thermal stability), an effect of the AC magnetic field may be maximally utilized. That is, a first layer having a large Hk may be disposed at the head side, and a second layer having a small Hk may be disposed at the magnetic recording medium substrate side.

Further, an anisotropic field of a third layer which is adjacent to the second layer of the magnetic recording medium to be opposite to the magnetic head side may be larger than an anisotropic field of the second layer. In addition, in the case where the anisotropic field of the second layer is relatively large, the anisotropic field of the third layer may be smaller than the anisotropic field of the second layer.

The reason is that it is effective to combine a structure where the anisotropic field Hk of the first layer is larger than the anisotropic field Hk of the second layer with a known ECC medium or CAP medium structure, and in this case, in order to maximally utilize the MAMR mechanism, a structure where the Hk of the first layer is larger than the Hk of the second layer is used for a surface structure of a magnetic recording medium having a large AC magnetic field, and the ECC or CAP medium structure may be applied to the magnetic recording medium substrate side. That is, the third layer having an Hk different from the second layer is provided at the substrate side of the second layer. In this case, when the Hk of the second layer is relatively small, the Hk of the third layer is set to be larger than that of the second layer, and when the Hk of the second layer is relatively large, the Hk of the third layer is set to be smaller than that of the second layer. In any case, thermal stability of the entire layer (sum of Kux particle volume/(kT) every layer, Ku: magnetic anisotropy energy, k: Boltzmann constant, T: temperature) may be set to be increased.

Further, Patent Documents 2 and 3 disclose the multilayered media in which magnetic anisotropy of the first layer is 2.5 to $5 \times 10^6$ erg/cc, and magnetic anisotropy of the second layer is 1 to $2.5 \times 10^6$ erg/cc, but the multilayered media are not based on the MAMR and can be magnetization-reversed without a microwave assist. Accordingly, Patent Documents 2 and 3 are different from the present invention. Further, in a general multilayered medium, since saturated magnetization Ms of the first layer and the second layer is about 500 emu/cc, and an anisotropic field applying magnetic anisotropy of 2.5 to $5 \times 10^6$ erg/cc to the first layer is 10 to 20 kOe, which is different from a preferable range of the anisotropic field of the first layer in the present invention.

Next, the reason why in a position of the magnetic recording medium (particularly, multilayered recording layer) where information is recorded by a recording magnetic field generated in the recording magnetic pole and a high frequency magnetic field generated in the high frequency magnetic field generating element, when an intensity of the recording magnetic field is Hdc, an angle between the recording magnetic field and a magnetic anisotropic easy axis of the magnetic recording medium is $\phi$, an intensity of the high frequency magnetic field is Hac, a frequency of the high frequency magnetic field is fac, and a damping coefficient of each layer of the magnetic recording medium (particularly, multilayered recording layer) is $\alpha$, an average value of anisotropic fields is Hk, Hk<3·Hdc when $\alpha$>0.1, fac<40 GHz, and $\phi$<30° or $\phi$>60°, and 2·Hdc<Hk<3·Hdc when $\alpha$>0.1, fac<40 GHz, and 30°<$\phi$<60°, will be described.

The reason is that in order to forcibly vibrate magnetization of the magnetic recording medium by the AC magnetic field, the damping coefficient of the magnetic recording medium may be relatively large, and in more detail, the damping coefficient may be 0.1 or 0.15 or more. Further, in the reversal process, a DC component (effective magnetic field) other than AC magnetic field applied to the magnetic recording medium has sufficiently small torque which influencing the medium magnetization. When satisfying these conditions, the medium magnetization depends on an external magnetic field. Further, in order that a selective reversal is generated by the MAMR, when the AC magnetic field does not exist and only the DC component exists, a magnetic energy barrier may exist substantially between an upward state and a downward state of the medium magnetization. Conditions in which the energy barrier exists and the torque of the DC component (effective magnetic field) influencing magnetization is sufficiently small are achieved by setting a magnitude and an angle of an external head magnetic field in the range, according to the Hk of the magnetic recording medium.

Figure 3:
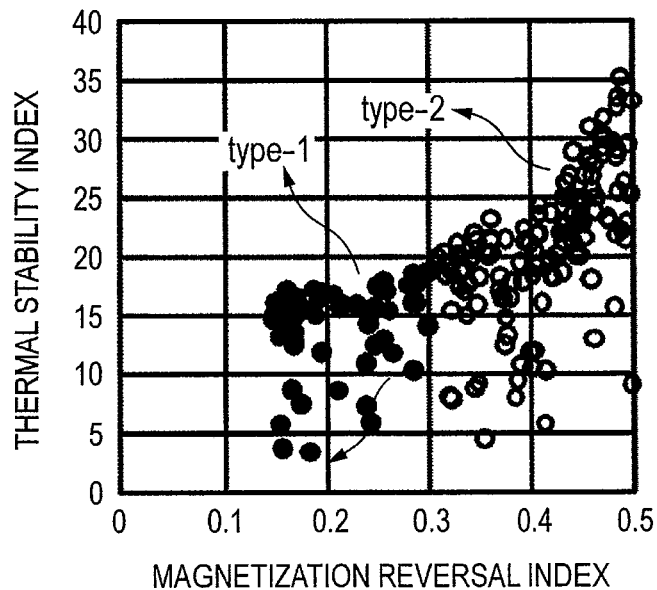
FIG. 3 is a characteristic diagram for describing a principle of the present invention and a diagram illustrating a relationship between a magnetization reversal index and a thermal stability index of a magnetic crystal grain configuring a magnetic recording medium.
Figure 4:
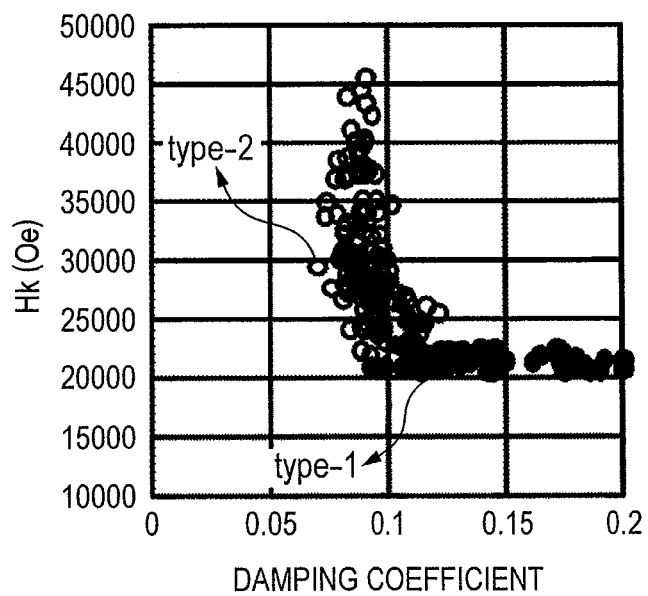
FIG. 4 is a characteristic diagram for describing a principle of the present invention and a diagram illustrating a relationship between a damping coefficient and an anisotropic field.

Hereinafter, details will be described. First, effectiveness of configuration that the anisotropic field Hk of the first layer is set to be larger than 20 kOe and the anisotropic field Hk of the first layer is set to be larger than the anisotropic field Hk of the second layer will be described. First, in order to easily describe interaction between the AC magnetic field and the medium magnetization, a single-layered medium will be described as an example. FIG. 3 illustrates a simulation result of examining a relationship between a magnetization reversal index and a thermal stability index in the case where a magnetic crystal grain configuring the magnetic recording medium is selectively reversed, in magnetic recording media having various designs. Here, the magnetization reversal index is defined by a time average of an absolute value of a difference between a time change H(t) of a standardized recording signal magnetic field and a time change m/z(t) of a z component of standardized medium magnetization m, and the smaller the magnetization reversal index, the better the recording. Further, the thermal stability index is defined by a ratio of the aforementioned magnetic anisotropy energy (Ku×V) and heat disturbance energy (k×T) (sum of KuV/kT for each layer in the multilayered medium), and the larger the thermal stability index, the higher thermal stability and resistance to heat disturbance. The magnetization reversal performance and the thermal stability have a trade-off relationship. Here, with respect to a solution of high magnetization reversal performance and low thermal stability (type-1, black circle of FIG. 3) and a solution of low magnetization reversal performance and high thermal stability (type-2, white circle of FIG. 3), change aspects (simulation result) with time of the AC magnetic field and the medium magnetization before and after magnetization reversal are illustrated in FIG. 5A and FIG. 5B, respectively. Further, FIG. 4 illustrates a relationship between the damping coefficient $\alpha$ and the anisotropic field Hk with respect to the type-1 and the type-2.

Since in a reversal solution of the type-1 having high magnetization reversal performance and low thermal stability, $\alpha$ is large and damping is relatively large, the magnetization depends on a change of the external magnetic field and vibrates at an AC frequency by compulsory vibration, and the magnetization is substantially parallel to a surface of the magnetic recording medium and thus a movement frequency is substantially matched with the AC frequency, and as a result, the magnetization is reversed. Therefore, it is considered that the magnetization reversal is performed by (1) step 1 in which magnetization m in a z direction depends on the DC magnetic field from a main magnetic pole and receives torque from a y component Hac of the AC magnetic field to be changed up to an angle $\theta$ within a time $\Delta t$ (of a half of an AC period or less), and (2) step 2 in which the magnetization is reversed by torque from the in-plane magnetic field. When an angle between the DC magnetic field and the z axis is $\theta 1$ and an angle variation by the AC magnetic field is $\theta 2$, $\theta = \theta 1 + \theta 2$.

Meanwhile, in the reversal solution of the type-2 having low magnetization reversal performance and high thermal stability, $\alpha$ is decreased and the magnetization performs precession in a state of being substantially parallel to the surface of the magnetic recording medium, but a frequency of the precession moves by the AC magnetic field to be matched with the AC frequency, and when the a phase difference of the frequency of the precession and the AC frequency is matched with a reversal acceleration direction, the magnetization is reversed. That is, it is considered that the magnetization reversal is performed by (1) step 1 in which magnetization m which performs precession at a predetermined angle in a z direction as an axis receives torque from a y component and an x component Hac of the AC magnetic field to be changed up to an angle $\theta$ within a time $\Delta t$, and the same step 2 as described above. In this case, when an angle between the magnetization by the precession and the z axis is $\theta 1$ and an angle variation by the AC magnetic field is $\theta 2$, like the above, $\theta = \theta 1 + \theta 2$.

Here, it is considered that when $\theta$ is an angle where the z component of the effective magnetic field is approximately 0, rotating torque in an in-plane direction is approximately 0, and as a result, a reversal time is sufficiently secured and step 2 is substantially automatically performed. From the above, $\Delta m = \gamma \cdot Hac \cdot m \cdot \Delta t > m \sin \theta 2$, and $Heff = -Hk \cdot \cos \theta + Hext\_z + Hd\_z + Hexch\_z = 0$.

Accordingly, a maximum of the reversible anisotropic field Hk is represented by the following Equation. Further, Hextz represents an external magnetic field, Hd_z represents a demagnetizing field, and Hexch_z represents a z component of each exchange magnetic field. $Hk \sim (Hextz + Hdz + Hexchz)/\cos(\theta 1 + \theta 2)$. Here, for simplification, if $\theta 1$ is 45° at which the effective magnetic field in a known Stoner-Wohlfarth model becomes maximal, $Hk \sim 2^{0.5} \cdot (Hextz + Hd\_z + Hexch\_z)/(\cos \theta 2 - \sin \theta 2) = 2^{0.5} \cdot (Hext\_z + Hd\_z + Hexch\_z)/\{(1-(\gamma \cdot Hac \cdot \Delta t)2)^{0.5} - \gamma \cdot Hac \cdot \Delta\}$ From the equation, the AC magnetic field Hac exists, and as a result, the maximum of the reversible Hk is increased by $1/\{(1-(\gamma \cdot Hac \cdot \Delta t)2)^{0.5} - \gamma \cdot Hac \cdot \Delta t\}$ times. According to the discussion of the inventors, when the Hac is 1,000 kOe and the AC frequency is about 30 GHz, an efficient assist effect is obtained, and in this case, the reversible Hk is increased by about 1.5 times of Hk of the equation. Accordingly, when Hk of an upper layer of a vertical magnetic recording medium in the related art is 10 kOe to 20 kOe, in the MAMR, the anisotropic field Hk of the upper layer of the multilayered medium exceeds 20 kOe and furthermore, becomes 30 kOe or more, and as a result, an efficient assist effect is obtained.

Here, since the dimension of the main magnetic pole is larger than the dimension of the high frequency field generation layer FGL, distribution of the recording magnetic field generated by the main magnetic pole is more uniform than the distribution of the high frequency magnetic field generated by the FGL. That is, Hac_y is rapidly reduced in the film thickness direction as compared with Hext_z. Therefore, when a demagnetizing field Hd_z and an exchange magnetic field Hexch_z are not largely changed in the film thickness direction, the reversible Hk by the microwave is rapidly reduced in the film thickness direction. Accordingly, the distribution of the Hk in the film thickness direction is set to a maximum Hk which is reversible by the microwave at each position in the film thickness direction, and as a result, reversal selectivity and thermal stability by the microwave may be maximized.

Figure 6:
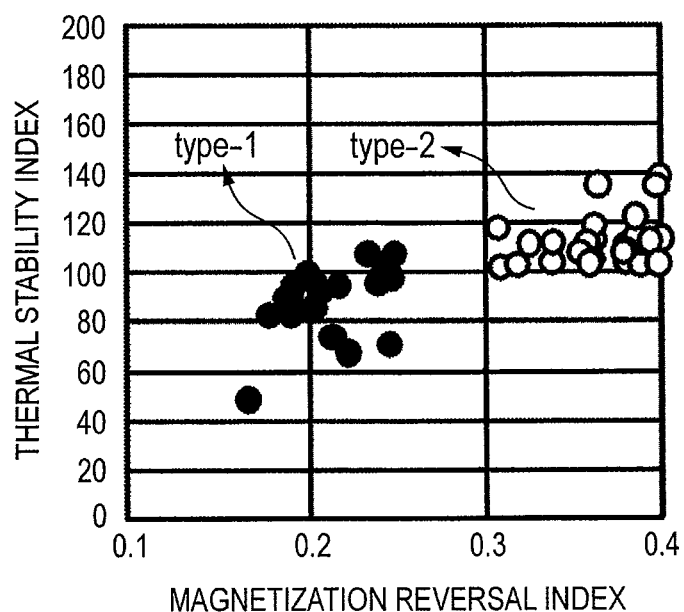
FIG. 6 is a characteristic diagram illustrating performance of a magnetic memory device according to an embodiment of the present invention and a diagram illustrating a relationship between a magnetization reversal index and a thermal stability index.
Figure 7:
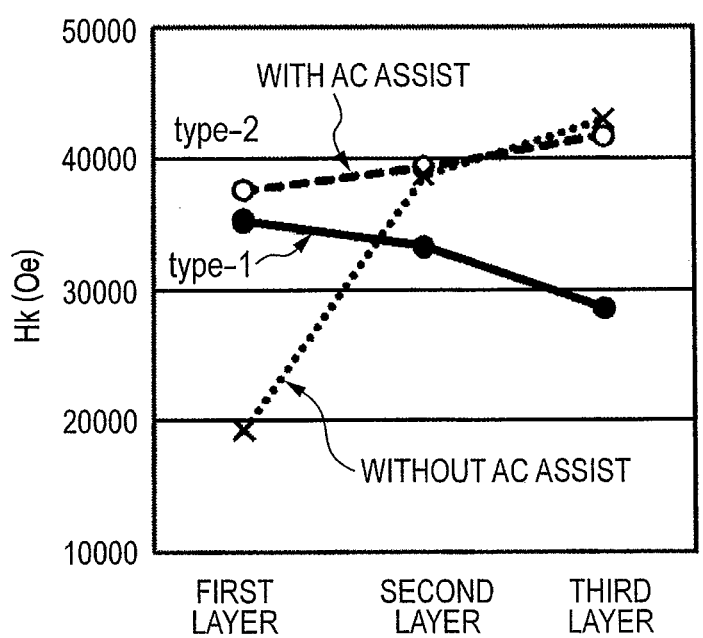
FIG. 7 is a characteristic diagram illustrating a configuration of an average anisotropic field of a magnetic recording medium (three layers) according to an embodiment of the present invention.

Then, next, possibility of selective reversal by an assist effect with respect to the multilayered medium having many layers was examined. In each dot of FIG. 6, a magnetization reversal index and a thermal stability index in the case where selective reversal is possible have a trade-off relationship like the single-layered medium. Among the dots, averages of film thickness directional distribution of Hk and $\alpha$ of various kinds of magnetic recording media which belong to a group (type-1, black circle of FIG. 6) having high magnetization reversal performance and low thermal stability and a group (type-2, white circle of FIG. 6) having low magnetization reversal performance and high thermal stability, respectively, are represented by a solid line and a dashed line of FIG. 7. For comparison, the same result as the case of not using an assist is represented by a dotted line in FIG. 7.

Figure 2:
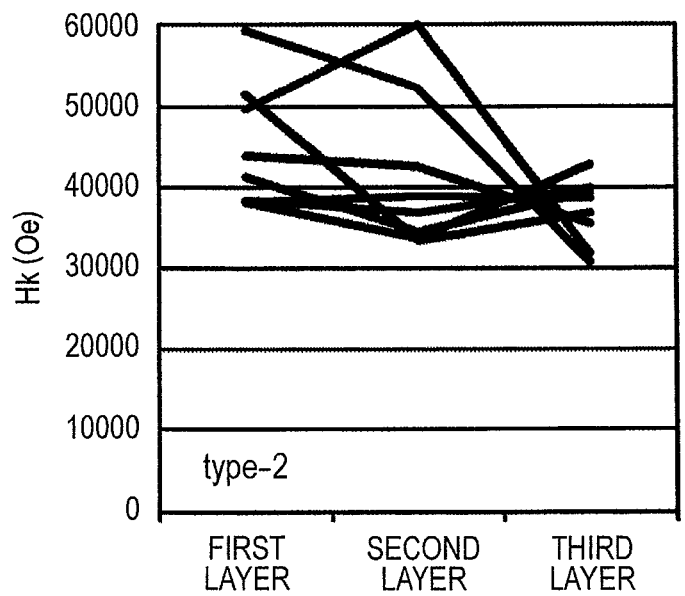
FIG. 2 is a characteristic diagram illustrating a configuration of a typical anisotropic field of another magnetic recording medium (type-2, three layers) according to an embodiment of the present invention.

When not using the assist, the reversal solution for maximizing thermal stability has an anisotropic field Hk of the first layer of 20 kOe or less and Hk distribution which increases in the film thickness direction. On the contrary, when using an assist effect, the Hk of the first layer is more than 20 kOe and 30 kOe or more, and as a result, thermal stability is maximized and selective reversal is possible. Further, in the case (type-1) of focusing on the magnetization reversal performance according to an assist effect, it is effective that the Hk of the second layer is smaller than the Hk of the first layer. Even in the type-2, in the case of enhancing the assist effect by reinforcing an intensity of the AC magnetic field or an intensity of the head magnetic field, in order to maximize thermal stability, it is effective that the Hk of the second layer is smaller than the Hk of the first layer. FIG. 1 illustrates a typical Hk distribution which belongs to the type-1 and obtains high selective reversal performance according to an assist effect. FIG. 2 illustrates a typical Hk distribution which belongs to the type-2 and obtains high thermal stability according to an assist effect.

Further, in a manufacturing process of the multilayered film, a material composition is not necessarily limited to being discontinuously changed and may be continuously changed. In this case, average values of anisotropic fields Hk near the layer surface and in the layer of the magnetic recording medium are considered as the Hk of the first layer and the second layer. In addition, even though a magnitude correlation between the Hk of the surface side and the Hk of the inside is locally reversed in the film thickness direction, in the range which does not deviate from a purpose of an effect of the present invention, the relationship may be satisfied between an average value of the layer surface side and an average value of the inside. For example, in FIGS. 1 and 2, there is the distribution in which the Hk of the second layer is larger than the Hk of the first layer, but the average value of the Hk of the second layer and the Hk of the first layer is larger than the Hk of the third layer. Accordingly, substantially, the effect of the present invention occurs.

Hereinabove, the characteristic distribution of the magnetic recording medium capable of improving the thermal stability and the recording density by maximally efficiently using the assist effect has been described. Meanwhile, the assist effect depends on the AC magnetic field, the head magnetic field, and the like. For example, although omitted in the equation for simplification, since a general head magnetic field is inclined from a medium magnetic anisotropic easy axis, it is expected that a value of the θ required for the compulsory vibration by the AC magnetic field is reduced. Further, the most suitable configuration of the anisotropic field Hk from the equation depends on saturated magnetization of each layer or coupling between layers according to a demagnetizing field or an exchange magnetic field. Next, effectiveness of setting an intensity and an angle of the head magnetic field, an intensity and a frequency of the AC magnetic field, a damping coefficient of the magnetic recording medium, an anisotropic field, and saturated magnetization to the predetermined range will be described. The movement of the medium magnetization is similar to a combination of the precession with the DC component other than the AC magnetic field of the effective magnetic field applied to the magnetic recording medium as an axis and the compulsory vibration by the AC magnetic field. The magnetization is reversed when the frequency and the phase of the in-plane directional rotary motion of the magnetic recording medium of the medium magnetization are substantially matched with the frequency and the phase of the AC magnetic field. Here, the AC magnetic field is generated by the precession of the magnetization of the high frequency field generation layer FGL, but it is considered that it is practically difficult to generate a frequency of 40 GHz or more due to actual restrictions on a material property and a configuration of the FGL. Meanwhile, when torque of the DC component influencing the magnetization is increased, the frequency of the precession is increased. Accordingly, in order to match the movement of the medium magnetization with that of the AC magnetic field, it is preferable that the torque of the DC component influencing the magnetization is received. Further, generally, in the MAMR, it is considered that damping may be small in order to accelerate the rotary motion of the magnetic recording medium by the high frequency magnetic field, but the compulsory vibration by the AC magnetic filed is difficult because the damping accelerates the precession by the DC component. Accordingly, since the AC magnetic field and the precession need to be accurately synchronized for a relatively long time, there is a problem in that it takes time to achieve the magnetization reversal. According to the discussion of the inventors, the compulsory vibration by the AC magnetic field is efficiently generated when the damping coefficient of the magnetic recording medium is 0.1 or more, and in this case, rapid magnetization reversal is achieved.

Figure 8:
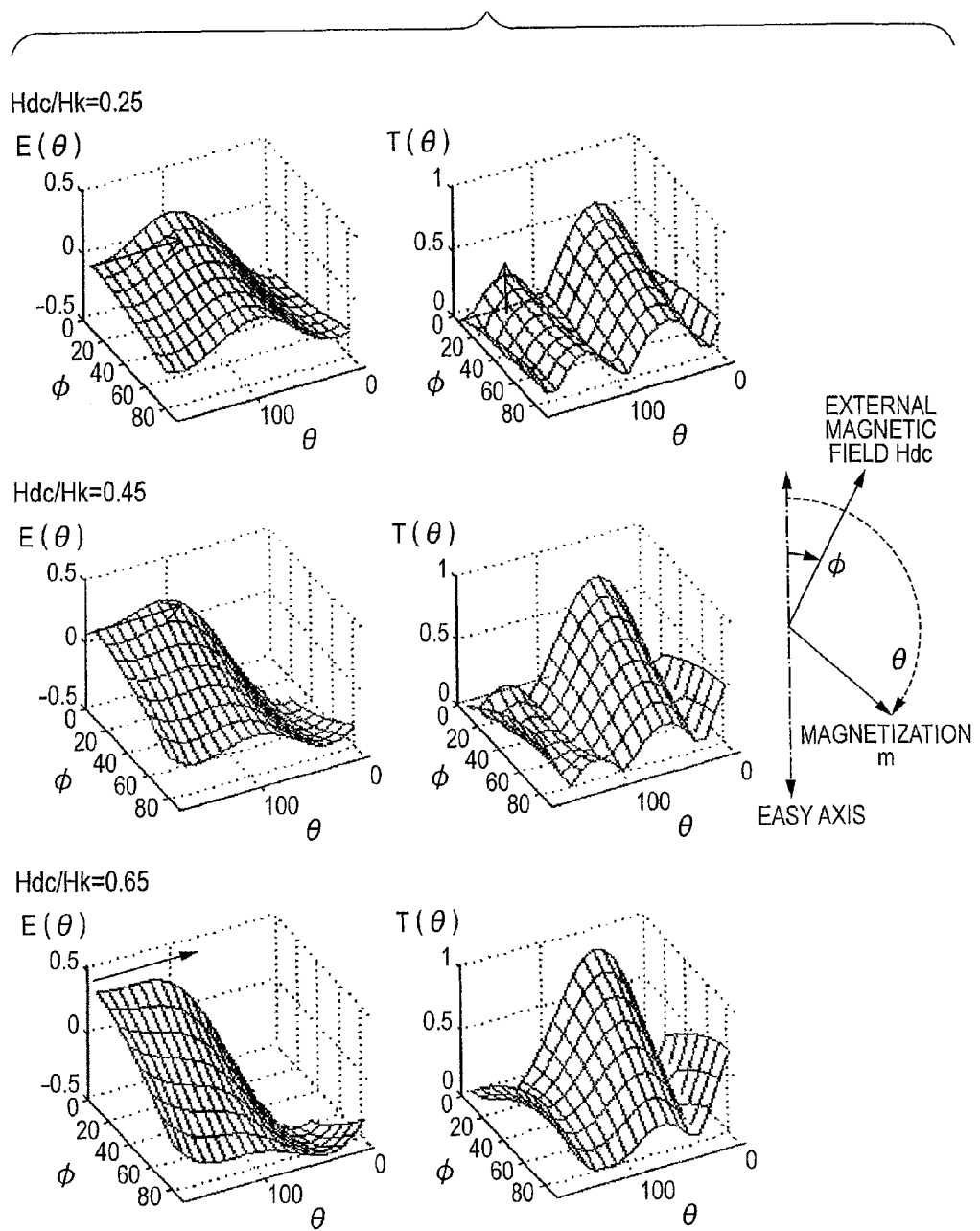
FIG. 8 is a characteristic diagram for describing a principle of the present invention.

In the magnetization reversal process, the DC component of the effective magnetic field is changed together when the head magnetic field according to the magnetic recording medium is reversed and thereafter, the direction of the medium magnetization is changed and thus a component derived from the magnetic anisotropy of the effective magnetic field is changed. As a result, the frequency of the precession of the medium magnetization is changed. The change of the magnetization by the torque received from the DC component will be described through a known Storner-Wohlfarth model. When an angle between the magnetic anisotropy easy axis of the magnetic recording medium and the magnetization m is θ, an angle between the easy axis and the head magnetic field Hdc is φ, and a ratio of the head magnetic field and the Hk is h, energy E of a dimensionless system and torque T received in the magnetization are represented as follows as functions of θ, φ, and h. $E=-\cos(2\theta)/4-h\cdot\cos(\phi-\theta)$ $T=|lm\times Heff|$, Here, firstly, in order to generate the selective reversal, an energy barrier needs to exist with respect to any φ and h while θ is changed from 180° to 0°. Secondly, in order to generate the assist by the AC magnetic field, the motion frequency of the magnetization by the compulsory vibration by the AC magnetic field needs to be matched with the AC magnetic field. To this end, with respect to any φ and h, while θ is changed from 180° to 0°, the torque of the precession by the DC component needs to be sufficiently small, in the θ range corresponding to a process of ascending the energy barrier. Here, distributions of E(θ, φ) and T(θ, φ) when h=0.65, 0.45 and 0.25 are illustrated in FIG. 8. First, in the case of h=0.65, since the energy barrier does not exist regardless of a value of φ, the magnetization reversal is generated even without the AC assist. That is, the selective reversal condition is not obtained. Next, in the case of h=0.45, when φ is about 45°, since the energy barrier does not exist, the magnetization reversal is generated even without the AC assist. Meanwhile, when φ is close to 0° or 90°, the energy barrier exists, and further, a corresponding torque value is small in the θ range corresponding to a process of ascending the energy barrier from 180° side toward 0° side. Accordingly, since the precession is suppressed, the selective reversal due to the AC assist effect may be generated. When h=0.25, regardless of the value of φ, the energy barrier exists. However, the torque value for the θ range corresponding to a process of ascending the energy barrier from 180° side toward 0° side is large as compared with the case of h=0.5. As a result, the magnetization performs the precession. Accordingly, the frequency and the phase of the AC magnetic field need to be matched with those of the precession. Even in the case, when α is relatively large, the frequency of the external AC magnetic field is close to the precession frequency by the effective magnetic field, and the magnetic intensity is sufficient, the precession frequency moves to be synchronized with the AC magnetic field frequency, and as a result, the magnetization may be reversed.

Figure 9:
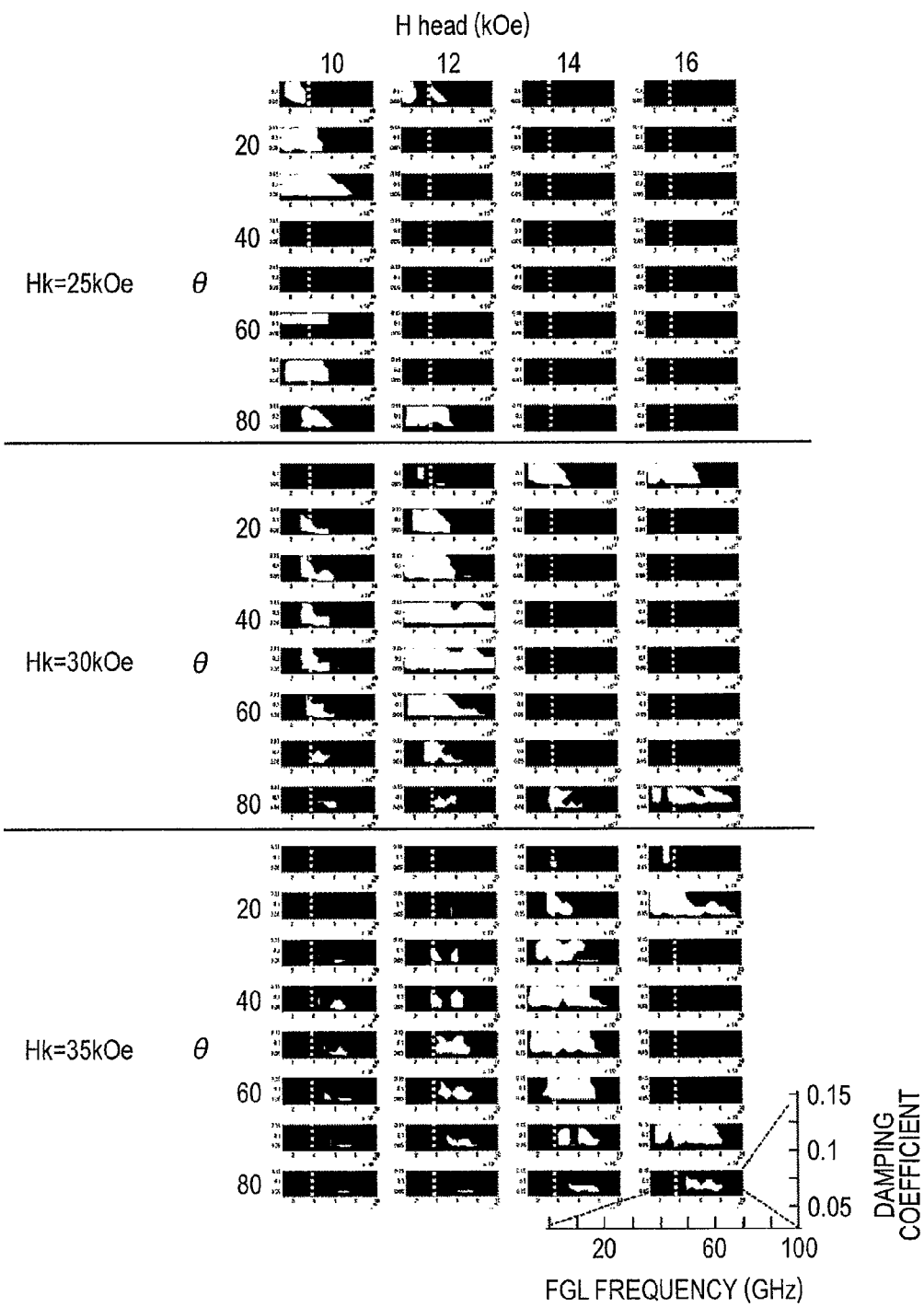
FIG. 9 is a characteristic diagram illustrating performance of the magnetic memory device according to the embodiment of the present invention.

Here, by variously changing the intensity Hdc and the angle φ of the recording magnetic field, the intensity Hac and the frequency fac of the high frequency magnetic field, the damping coefficient α of each layer of the recording medium, the average value Hk of the anisotropic magnetic field, and the average value Ms of the saturated magnetization, the effectiveness of the AC assist for the medium magnetization reversal is calculated. First, in the case where the head magnetic field is changed from downward (negative) to upward (positive) for an ascending time of 0.1 nsec, with respect to medium magnetizations (standardization by a maximum value) m/z_on and m/z_off (a maximum and a minimum are 1 and −1, respectively) for the case without the assist and the case with the assist, a value obtained by integrating (1−mz_off)*(1+mzon)/4 for a predetermined time is defined as an assist effect index. The assist effect index has a definition value of 1 or less, but the assist effect is increased as the value is closer to 1. Only in the case of the magnetization is reversed without the assist or in the case of magnetization is not reversed even with the assist, the index is decreased, and only in the case where the magnetization is not reversed even without the assist and is reversed by the assist, the index is close to 1. FIG. 9 illustrates a result of calculating a two-dimensional map depending on the AC magnetic field frequency fac of the assist effect index and the medium damping coefficient α with respect to various medium anisotropic fields Hk, in a matrix in which different head magnetic field intensities Hdc and angles φ are 2-dimensionally arranged. FIG. 9 illustrates that as a color becomes faint (white region), the assist effect is increased. From the result, a desired assist effect is obtained for the AC frequency of 40 GHz or less when Hk<3·Hdc if α>0.1, fac<40 GHz, and φ<30° or φ>60°, and 2·Hdc<Hk<3·Hdc if α>0.1, fac<40 GHz, and 30°<φ<60°.

As described above, in a microwave assisted magnetic recording (MAMR) scheme, by both a microwave assist effect at the surface side (head side) of the magnetic recording medium and an ECC effect at the substrate side of the magnetic recording medium, the magnetization of the magnetic recording medium having a large Ku which makes reversal difficult without the microwave assist effect in a small head magnetic field can be reversed. Further, since the magnetization of the magnetic recording medium is reversed only in a region where the information is not recorded in the magnetic recording medium only by the recording magnetic field from the main magnetic pole and the high frequency magnetic field from the high frequency field generation layer FGL is applied to the recording magnetic field, a recording width may be defined by a width of the FGL where a minute process is relatively easy, and sufficiently large recording magnetization is obtained without reducing the recording magnetic field by a narrow width of the magnetic pole, by using a main magnetic pole having a large width. Accordingly, it is possible to reverse the magnetization of the magnetic recording medium having a large Ku. Further, it is possible to reverse the magnetization of the magnetic recording medium having a large Ku which makes reversal difficult without the microwave assist effect by the high frequency magnetic field of a relatively low frequency. As described above, by the magnetic memory device and the magnetic recording medium in the embodiment, recording density may be increased by surpassing superparamagnetic limits of a vertical magnetic recording method in the related art.

Here, embodiments will be described with reference to drawings.

First Embodiment

Figure 10:
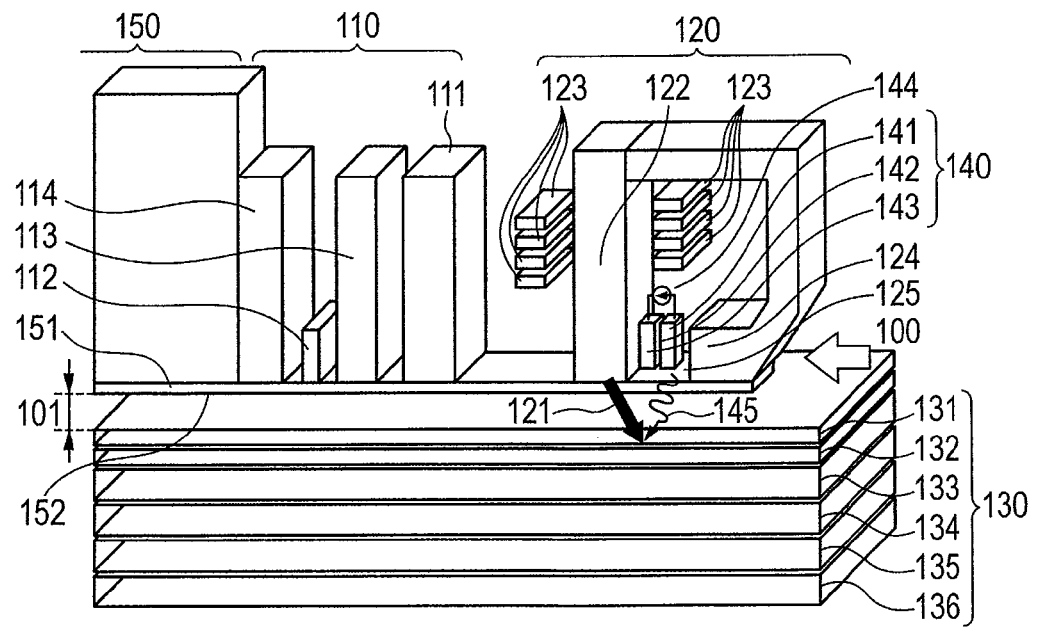
FIG. 10 is a schematic diagram illustrating a configuration of main parts of a magnetic memory device according to a first embodiment of the present invention.

A first embodiment will be described with reference to FIGS. 10 to 13. FIG. 10 is a schematic diagram of a magnetic read/write head which is a part of a configuration example of a magnetic memory device (magnetic recording reproduction device) according to the embodiment. Further, in respective drawings, the same reference numerals designate the same constituent elements. The magnetic read/write head includes a clearance 101 on a magnetic recording medium 130, and a read head part 110 and a write head part 120 which are formed on a slider 150 relatively traveling in a direction 100. Reference numeral 151 represents a head protecting layer configured by a CVD-C, a filtered cathodic arc carbon (FCAC), and the like, and reference numeral 152 represents an air bearing surface (ABS) of the magnetic read/write head. The slider 150 has a size of about 0.85×0.7×0.23 mm as a femto type by performing etching on the ABS surface of Al2O3-Tic ceramics etched to generate negative pressure so that floating quantity of the magnetic head pole part is about 10 nm throughout the entire circumference of the magnetic recording medium. In the embodiment, the magnetic read/write head is configured so that the magnetic recording medium 130 relatively moves in a direction in which the read head part 110 is a front side and the write head part 120 is a rear side, but may be reversely configured, and further, the head protecting layer 151 may be omitted.

The read head part 110 includes a shield layer 111, a reproduction sensor element (magnetic reproduction element) 112, an upper magnetic shield 113, and a lower magnetic shield 114. The reproduction sensor element 112 serves to reproduce a signal from the magnetic recording medium, and the configuration may be a configuration of obtaining a tunneling magneto-resistive (TMR) effect, a current perpendicularto plane (CPP)-GMR effect, or an extraordinary magneto-resistive (EMR) effect, and furthermore, a configuration to which a spin torque oscillator (STO) effect is applied, so-called a differential scheme. A width $T_{rw}$ is designed and processed according to a target recording magnetic field and recording density, and the size thereof is about 80 nm or 5 nm. Further, an extraction terminal of output is omitted in the same drawing and disclosed.

The write head part 120 is configured by a high frequency magnetic field generating element 140 for generating a high frequency magnetic field 145, a first recording magnetic pole 122 for generating a write head magnetic field 121, a second recording magnetic pole 124 for controlling a magnetization rotary direction of the high frequency magnetic field generating element 140, and a coil 123 made of Cu or the like for exciting the recording magnetic poles. The roles of the first recording magnetic pole and the second recording magnetic pole may be changed. Further, in the drawing, the coil 123 is divided into the left and the right of the first recording magnetic pole 122, but actually, is disposed so as to surround the first recording magnetic pole 122. Reference numeral 125 represents a magnetic gap part between the recording magnetic pole 122 (first recording magnetic pole) and an auxiliary magnetic pole 124 (second recording magnetic pole). Here, in the recording magnetic pole 122, a high saturated magnetic flux soft magnetic film made of an FeCoNi alloy, a CoFe alloy, or the like is formed by a plating method or a sputtering method, and the recording magnetic pole 122 has a trapezoid shape in which a bevel angle is 10 to 20 degrees, and is formed so that a cross-section area is decreased as being close to the ABS surface. A width $T_{ww}$ of a recording element at a side where the recording magnetic pole 122 having the trapezoid shape is wide is designed and processed according to a target recording magnetic field and recording density, and the size is about 160 nm or 10 nm. Further, the recording magnetic pole 122 has a so-called wrap around structure (WAS) which surrounds the circumference by a non-magnetic layer as a soft magnetic alloy thin film such as a CoNiFe alloy and a NiFe alloy together with the auxiliary magnetic pole 124.

The high frequency magnetic field generating element 140 is configured by a high frequency field generation layer FGL 141 made of a soft magnetic alloy such as FeCo and NiFe, a hard magnetic alloy such as CoPt and CoCr, a magnetic alloy having negative vertical magnetic anisotropy such as $Fe_{0.4}Co_{0.6}$, $Fe_{0.01}Co_{0.99}$, and $Co_{0.8}Ir_{0.2}$, a Heusler alloy such as CoFeGe, CoMnGe, CoFeAl, CoFeSi, and CoMnSi, an Re-TM-based amorphous alloy such as TbFeCo, a magnetic artificial lattice such as Co/Fe and Co/Ir, and the like, an intermediate layer 142 made of a non-magnetic conductive material such as Au, Ag, Pt, Ta, Ir, Al, Si, Ge, Ti, and Cu, and a spin injection fixed layer 143 for applying spin torque to the high frequency field generation layer FGL. Here, a width WFGL of the FGL 141 is designed and processed according to a target recording magnetic field and recording density, and the size thereof is about 150 nm or 5 nm. Further, a film thickness of the non-magnetic intermediate layer 142 may be about 0.2 to 4 nm in order to acquire high spin injection efficiency, and since the oscillation of the FGL 141 may be stabilized by using a material having vertical anisotropy for the spin injection fixed layer 143, the spin injection fixed layer 143 may use an artificial magnetic material such as Co/Pt, Co/Ni, Co/Pd, and CoCrTa/Pd. Furthermore, in order to stabilize high frequency magnetization rotation of the FGL, a rotation guide ferromagnetic layer having the same configuration as the spin injection fixed layer 143 may be formed to be adjacent to the FGL 141. Further, a laminating order of the spin injection fixed layer 143 and the FGL 141 may be inversed. Further, the spin is supplied from a DC power supply 144 to the FGL 141, but in FIG. 10, a supply terminal of current is omitted and the supply of the spin is simply illustrated in order to illustrate the structure.

The magnetic recording medium 130 of the embodiment is configured by sequentially laminating a soft magnetic ground layer 135 made of FeCoTaZr and the like, a non-magnetic intermediate layer 134 made of Ru and the like, a recording layer 133 having a multilayered structure, a protective layer 132 made of C and the like, and a lubricant layer 131, on a non-magnetic substrate 136 made of glass or Al plated with Nip. Further, at least one non-magnetic layer may be provided between the soft magnetic ground layer 135 and the substrate 136, and a magnetic intermediate layer in addition to the non-magnetic intermediate layer 134 may be provided between the soft magnetic ground layer 135 and the magnetic layer (recording layer 133). Further, the soft magnetic ground layer 135 may be formed in a two-layered structure with Ru and the like interposed. Here, the recording layer 133 is configured by combining magnetic layers containing CoCrPt, $L1_2$-$Co_3$Pt-base alloys, a $L1_2$-$(CoCr)_3$Pt-base alloy, an $L1_1$-$Co_{50}Pt_{50}$-base alloy, CoCrB/Pt, CoB/Pd magnetic artificial lattice, L1o type FePt as main constituent elements, and each magnetic layer has a crystal structure having an average particle diameter of about 5 nm having vertical magnetic anisotropy by optimizing the non-magnetic intermediate layer 134. For example, here, the recording layer 133 is formed of three types of $L1_1$-Co and $Ni_yPt_{100-x-y}$ laminated films having different composition ratios (referred to as a first layer, a second layer, and a third layer in sequence from the surface side), and the Hks of the first layer, the second layer, and the third layer may become 35 kOe, 25 kOe, and 45 kOe, respectively, by controlling the compositions x and y. The average particle diameter of the crystal grain may be changed according to required recording density. Furthermore, the recording layer 133 controls magnetic exchange interaction between the crystal grains by mixing appropriate oxide, carbide, nitride, boride, of Ti, Nb, Zr, Ag, Si, Al, or the like or their mixtures with a target material and controlling a condition for forming a film to properly segregate a non-magnetic material from a crystal grain system at 0.5 to 2 nm. Further, in the embodiment, an example in which the magnetic layer (recording layer 133) and the like are provided on one side of the substrate 136 is described, but the magnetic layers (recording layers 133) may be provided on two sides of the non-magnetic substrate 136. In the embodiment, as an example of the magnetic recording medium 130, a continuous medium where respective bits continuously exist is described, but the magnetic recording medium 130 may be a pattern medium having a magnetic pattern of about 10 nm on the substrate.

Figure 11:
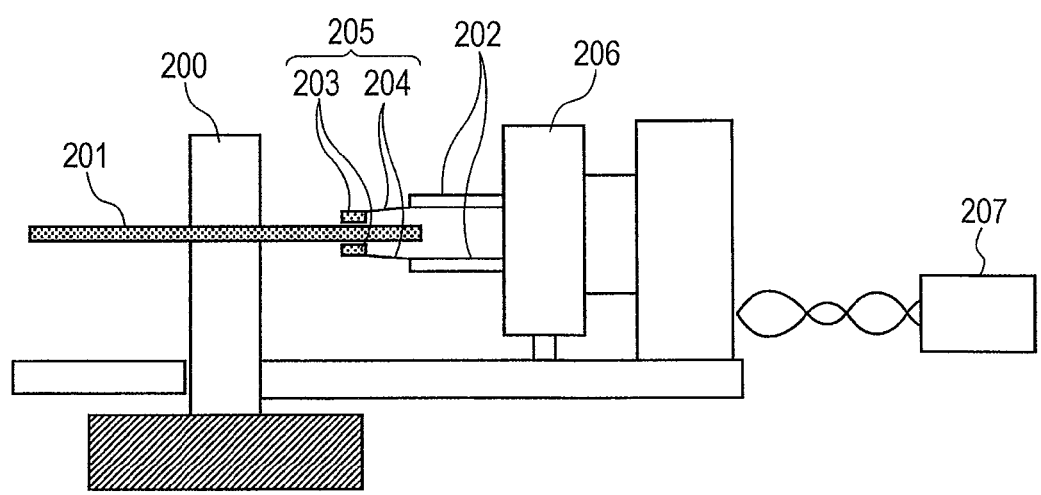
FIG. 11 is a schematic diagram illustrating overall configuration of the magnetic memory device according to the first embodiment of the present invention.

FIG. 11 illustrates a configuration example of a magnetic memory device (magnetic recording reproduction device) according to the embodiment. According to commands of recording and reproduction from an upper system, a magnetic recording medium 201 rotates by a spindle motor 200 at a predetermined rpm, detects a position on the magnetic recording medium by using a signal from servo information recorded in the magnetic recording medium 201 in a device manufacturing process in advance by a read head, and controls a magnetic head HGA (head gimbal assembly) 205 configured by a head slider 203 including a read head part and a write head part and a suspension 204 through an arm 202 by an actuator 206 to move onto a predetermined recording track of the magnetic recording medium 201 (a seek operation) and perform a following operation at the position of the predetermined recording track. Thereafter, when recording information on the track, while the recording signal is controlled by a circuit system 207 including an R/W-IC, a signal processing system, and the like through a wire provided at the suspension 204 in advance, the recording signal is recorded by a microwave assisted magnetic recording scheme (MAMR) on the recording track of the magnetic recording medium by the write head part. Further, when the information is reproduced, the signal is reproduced by the read head part, and the information is read through reproduction and demodulation signal processing of the signal processing system. The actuator 206 may be a rotary actuator from the viewpoint of downsizing and lightening of the device. In the embodiment, the number of the magnetic recording medium 201 is one and the number of the magnetic head sliders is two, but one magnetic recording medium may have one magnetic head slider, and further, the number of magnetic recording media and magnetic heads may be properly increased in plural according to a purpose.

An information recording operation when the magnetization reversal is determined in the magnetic field from the first recording magnetic pole 122 in the magnetic memory device according to the embodiment will be schematically described with reference to FIG. 12. Bipolar recording signal current flows in a coil 123 to generate magnetic flux in a magnetic circuit including the first recording magnetic pole 122, the soft magnetic ground layer 135 of the magnetic recording medium 130, and the second recording magnetic pole 124. Accordingly, a magnetic field according to a direction of the recording signal current is generated at the position of the medium recording layer 133 and the high frequency magnetic field generating element 140. Further, simultaneously, DC STO through current 149 flows in the high frequency magnetic field generating element 140. As a result, the magnetization of the high frequency field generation layer FGL 141 performs precession, and the high frequency magnetic field 145 is generated. In a recording area where the write head magnetic field (recoding magnetic field) 121 and the high frequency magnetic field 145 having a predetermined intensity or more are overlapped with each other in the magnetic recording medium, the recording layer 133 is magnetized according to the recording magnetic field direction by the assist effect of the high frequency magnetic field. An arrow in the recording layer 133 represents a magnetization direction. The magnetic recording medium 130 moves in a track direction 100 with respect to the write head part 120 including the first recording magnetic pole and the like and thus magnetization information according to the recording information is sequentially recorded in the track direction. Here, by optimally designing shapes and magnetic properties of the first recording magnetic pole 122, the second recording magnetic pole 124, and the soft magnetic ground layer 135, an absolute intensity of the write head magnetic field (recording magnetic field) 121 in the recording area and an angle between the magnetic recording medium surface and a normal are 10 kOe or more and 20 to 70 degrees, respectively. Further, by optimally designing the high frequency magnetic field generating element 140, a magnetic field intensity (amplitude) and an oscillation frequency of the microwave are 1 kOe or more and 20 to 40 GHz, respectively.

Figure 12:
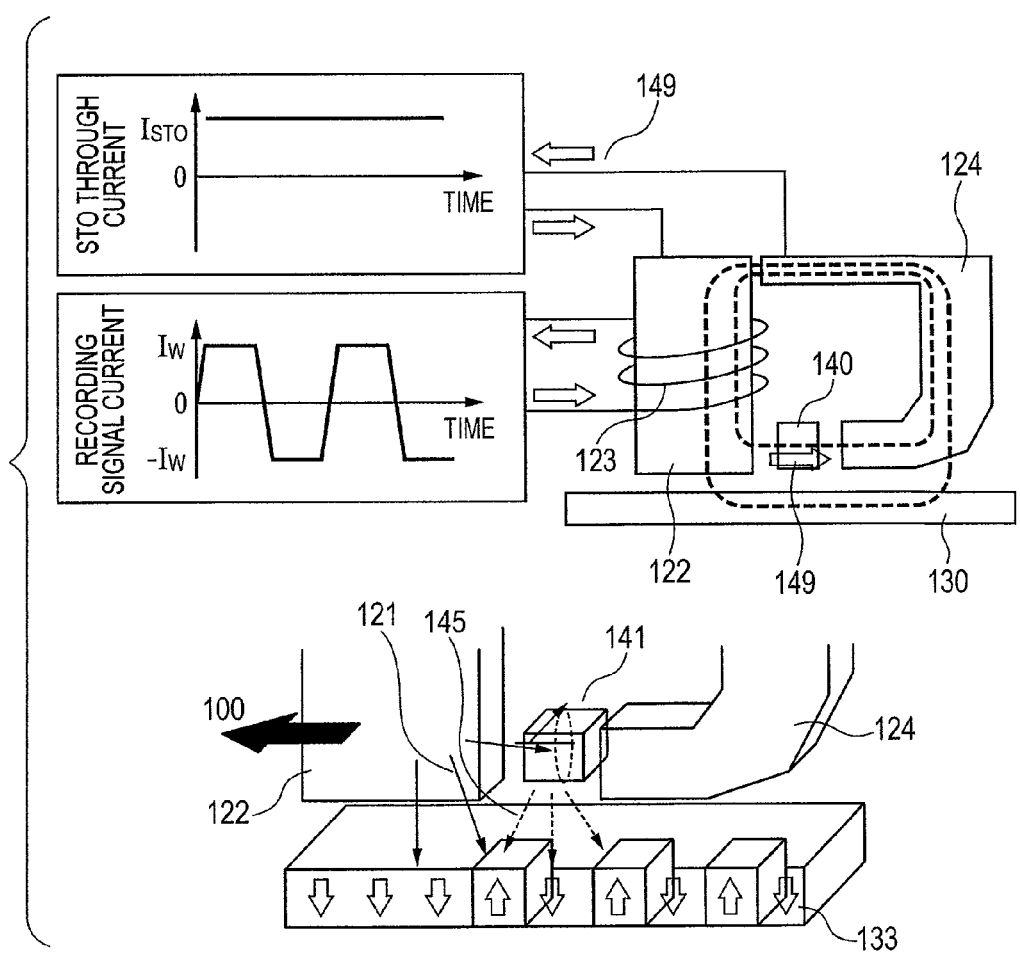
FIG. 12 is a schematic diagram for describing a recording method using the magnetic memory device according to the first embodiment of the present invention.

FIGS. 13A and 13B schematically illustrate a magnetization state of each layer of the high frequency magnetic field generating element 140 when the recording illustrated in FIG. 12 is performed in the magnetic recording medium 130. Here, reference numeral 146 denotes magnetization of the spin injection fixed layer 143, reference numeral 147 denotes magnetization of the high frequency field generation layer FGL 141, reference numeral 148 denotes a rotation direction of the magnetization 147 of the high frequency field generation layer FGL 141, and reference numeral 149 denotes DC STO through current supplied from the DC power supply 144 to the high frequency generating element 140. FIG. 13A illustrates a conceptual diagram of a case where an upward magnetization 137 recorded in the recording layer 133 of the magnetic recording medium 130 is rewritten downward. In the case, a recording signal current flows to the coil 123 of the write head so that the downward recording magnetic field 121 in the drawing is generated from the first recording magnetic pole 122. In this case, a part of the magnetic field from the first recording magnetic pole 122 is generated even in the gap part 125 toward the second recording magnetic pole 124. As illustrated in the same drawing, structures and materials of the first recording magnetic pole 122, the second recording magnetic pole 124, and the magnetic gap part 125, and a structure and a material of the high frequency magnetic field generating element 140 need to be designed in advance so as to generate an oscillation control magnetic field 126 strong enough to properly align the magnetization of the spin injection fixed layer 143 and the high frequency field generation layer FGL 141 in a right direction on FIG. 11. Simultaneously, electrons flow in the spin injection fixed layer 143 through an intermediate layer from the FGL 141 by the STO through current 149, but since conductivity of the electrons having the same magnetization of the fixed layer and the same directional spin in the spin injection fixed layer is larger than conductivity of the electrons having a reverse directional spin, the electrons having the magnetization of the fixed layer and the reverse directional spin are reflected from the intermediate layer and accumulated near an interface between the intermediate layer and the FGL. The FGL magnetization 147 receives torque from the oscillation control magnetic field 126 in an in-plane direction of the FGL layer, in a direction where the magnetization is close to the FGL surface rather than the electron spin, or in a vertical direction to the FGL surface according to a sign of an anisotropic magnetic field of the FGL 141 to perform precession by setting the oscillation control magnetic field 126 as a rotation axis without the reduction. Accordingly, the upward magnetization 137 of the magnetic recording medium is reversed to the downward magnetization 138 and the information is rewritten by generating the high frequency magnetic field which rotates or linearly vibrates in the medium plane at the position of the magnetic recording medium and assisting the downward recording magnetic field 121 by the high frequency magnetic field 145. Further, here, the oscillation frequency is determined by a sum of the oscillation control magnetic field and the anisotropic magnetic field of the FGL. As a result, for example, in the case where the FGL is configured by a soft magnetic material or a negative vertical magnetic anisotropic material, since the anisotropic field is small, the oscillation frequency of the FGL is determined according to an intensity of the oscillation control magnetic field 126.

Next, on the contrary, a case where the downward magnetization 138 recorded in the recording layer 133 is rewritten upward will be described with reference to a conceptual diagram of FIG. 13B. First, the strong oscillation control magnetic field 126 is applied to the spin injection fixed layer 143 and the FGL 141 in a reverse direction (left direction) to that of FIG. 13A, and directions of the magnetization of the spin injection fixed layer 143 and the FGL 141 are switched at high speed to be a left direction of the drawing. Since the direction of the STO through current 149 is not changed and the electrons having a spin in the opposite direction to the direction are accumulated near the interface between the intermediate layer and the FGL, all directions of effective magnetic fields due to the oscillation control magnetic field, the electron spin, and the magnetic anisotropy in the FGL 141 are opposite directions to those of FIG. 13A, and thus the precession is performed in a reverse direction. The generated high frequency magnetic field 145 assists the upward recording magnetic field 121, and as a result, the downward magnetization 138 of the magnetic recording medium is reversed upward and the information is rewritten. Further, the roles of the first magnetic pole and the second magnetic pole may be changed when performing the proper control above.

According to a known LLG simulation, it is verified that the FGL is stably oscillated without forming a magnetic domain structure even in any material of a soft magnetic material, a hard magnetic material, and a negative vertical magnetic anisotropic material by optimizing the film thickness to 1 to 100 nm and more preferably 5 to 30 nm and the width and the height in the range of about 20 to 40 nm or less and applying a high magnetic field. From this, the microwave assisted magnetic recording scheme is particularly suitable for high density recoding. As described above, according to the embodiment, it is possible to provide the magnetic recording medium and the magnetic memory device capable of implementing high recording density, in the case of using the microwave assisted magnetic recording (MAMR) scheme.

Second Embodiment

A second embodiment of the present invention will be described. Further, details which are disclosed in the first embodiment and are not disclosed in the embodiment may be applied to the embodiment as far as there are no special circumstances.

In the embodiment, examples of a magnetic memory device and a magnetic recording medium having excellent thermal stability and improving an SN ratio in a magnetic recording reproduction process by using the MAMR scheme will be described.

In the embodiment, since substantially the same device configuration as the first embodiment is used except for the structure of the magnetic recording medium, hereinafter, only a structure of the magnetic recording medium will be described. In the first embodiment, magnetic exchange interaction between crystal grains is suppressed by segregating oxide from a crystal grain system of each layer of the recording layer. On the contrary, in the embodiment, the oxide is suppressed from flowing into the first layer of the recording layer in order to suppress roughness of the surface of the magnetic recording medium due to the segregation of the crystal grain system. As a result, since the magnetic exchange interaction is superior in the first layer, the thermal stability is secured by controlling the Hks of the first layer, the second layer, and the third layer to be about 30 kOe, 20 kOe, and 40 kOe, respectively and increasing saturated magnetization of each layer. These may be implemented in a manufacturing process in the related art.

As described above, according to the embodiment, it is possible to provide the magnetic recording medium and the magnetic memory device capable of implementing high recording density, in the case of using the microwave assisted magnetic recording (MAMR) scheme. Further, by suppressing segregation of oxide from the crystal grain system in the first layer of the magnetic memory medium, roughness of the surface is suppressed and the saturated magnetization is increased thereby to improve thermal stability.

Third Embodiment

A third embodiment of the present invention will be described. Further, details which are disclosed in the first or second embodiment and are not disclosed in the embodiment may be applied to the embodiment as far as there are no special circumstances.

In the embodiment, examples of a magnetic recording medium and a magnetic memory device with more improved thermal stability will be described. Since the device configuration of the embodiment uses substantially the same configuration as the first embodiment, the description for the device configuration is omitted. Hereinafter, a structure of a magnetic recording medium of the embodiment will be described.

In the third embodiment, the recording layer 3 is formed of three types of $L1_o$-$Fe_xNi_yPt_{100-x-y}$ laminated films having different composition ratios (referred to as a first layer, a second layer, and a third layer in sequence from the surface side), and the Hks of the first layer, the second layer, and the third layer may become 60 kOe, 50 kOe, and 30 kOe, respectively, by controlling x and y. Further, the recording layer controls the magnetic exchange interaction between the crystal grains by properly mixing oxide containing $TiO_2$, $SiO_2$, $ZrO_2$, $NbO_2$, AgO, and the like and carbide containing TiC, SiC, and the like with a target material and optimizing a film forming process to segregate an oxidation component thereof, a carbonization component thereof, or a mixed component thereof from the crystal grain system at 0.8 to 1.2 nm. These may be implemented in a manufacturing process in the related art.

Further, an intermediate layer of the magnetic recording medium is designed so as to have magnetism of which the average of the particle diameter of the crystal grain is about 4 nm. Further, shapes and magnetic properties of the first recording magnetic pole 122, the second recording magnetic pole 124, and the soft magnetic ground layer 135 are optimally designed. Particularly, by setting a width of the first recording magnetic pole to 100 nm or more, an absolute intensity of the write head magnetic field 121 in the recording area and an angle between the magnetic recording medium surface and a normal are 12 kOe or more and about 40 degrees, respectively. Further, by optimally designing a shape and a material configuration of the high frequency magnetic field generating element 140 by setting a width of the high frequency generation layer to 20 nm, a magnetic field intensity (amplitude) and an oscillation frequency of the microwave are 1 kOe or more and about 60 GHz, respectively. In the embodiment, even in the magnetic recording medium having a minute particle diameter of about 4 nm, sufficient thermal stability is obtained, and further, the width of the recording bit becomes about 20 to 25 nm because the width of the recording bit is determined by selective reversal by the AC magnetic field from the FGL having a width of 20 nm.

Accordingly, according to the embodiment, it is expected that recording density of about 4 Tb/in2 may be obtained. As described above, according to the embodiment, it is possible to provide the magnetic recording medium and the magnetic memory device capable of implementing high recording density, in the case of using the microwave assisted magnetic recording (MAMR) scheme.

Fourth Embodiment

A fourth embodiment of the present invention will be described. Further, details which are disclosed in any one of the first to third embodiments and are not disclosed in the embodiment may be applied to the embodiment as far as there are no special circumstances.

In the embodiment, examples of a magnetic recording medium and a magnetic memory device focusing on continuity with a vertical magnetic recording medium in the related art will be described. Since the device configuration of the embodiment uses substantially the same configuration as the first embodiment, the description for the device configuration is omitted. Hereinafter, a structure of a magnetic recording medium of the embodiment will be described.

A recording layer 133 of the magnetic recording medium has a hcp structure and is formed of three types of CoPt-based laminated films having different composition ratios (referred to as a first layer, a second layer, and a third layer in sequence from the surface side), the Hks of the first layer, the second layer, and the third layer become about 25 kOe, 15 kOe, and 20 kOe, respectively, and the film thicknesses become about 5 nm, respectively. Further, the recording layer controls the magnetic exchange interaction between the crystal grains by properly mixing oxide containing $TiO_2$, $SiO_2$, $ZrO_2$, $NbO_2$, AgO, and the like and carbide containing TiC, SiC, and the like with a target material and optimizing a film forming process to segregate an oxidation component thereof, a carbonization component thereof, or a mixed component thereof from the crystal grain system at 0.8 to 1.2 nm. Further, an intermediate layer of the magnetic recording medium is designed so that the average of the particle diameter of the crystal grain is about 6 nm. Further, a CAP layer having Hk of 10 kOe and a film thickness of 2 nm or less is provided on the first layer. The surface is smoothed by maximally suppressing the segregation between crystal grains of the CAP layer. The CAP layer has the smallest Hk among layers configuring the recording layer and thus is for smoothing the recording surface, not for storing information as the recording layer, and in order to acquire the microwave assist effect, the film thickness may be maximally thin. That is, a weighted average value in the film thickness of each layer of the Hk of the CAP layer and the Hk of the first layer may be larger than an average Hk in the film thickness of the second layer and the third layer. These may be implemented in a manufacturing process in the related art.

Shapes and magnetic properties of the first recording magnetic pole 122, the second recording magnetic pole 124, and the soft magnetic ground layer 135 are optimally designed. Particularly, by setting a width of the first recording magnetic pole to 100 nm or more, an absolute intensity of the write head magnetic field 121 in the recording area and an angle between the magnetic recording medium surface and a normal are 12 kOe or more and about 40 degrees, respectively. Further, by setting a width of the high frequency generation layer to 30 nm and optimally designing a shape and a material configuration of the high frequency magnetic field generating element 140, a magnetic field intensity (amplitude) and an oscillation frequency of the microwave are 1 kOe or more and about 30 GHz, respectively. In the embodiment, even in the magnetic recording medium having a minute particle diameter of about 6 nm, sufficient thermal stability is obtained, and further, the width of the recording bit becomes about 30 to 40 nm because the width of the recording bit is determined by selective reversal by the AC magnetic field from the FGL having a width of 30 nm. Accordingly, according to the embodiment, it is expected that recording density of about 2 Tb/in2 may be obtained.

As described above, according to the embodiment, it is possible to provide the magnetic recording medium and the magnetic memory device capable of implementing high recording density, in the case of using the microwave assisted magnetic recording (MAMR) scheme.

Further, the present invention is not limited to the embodiments and includes various modified embodiments. For example, the embodiments are described in detail for simply describing the present invention and are not necessarily limited to including all the configurations described above. In addition, a part of a configuration of an embodiment can be substituted with a configuration of another embodiment, and further, the configuration of an embodiment can be added to the configuration of another embodiment. Further, another configuration can be added to, removed from, and substituted with a part of the configuration of each embodiment.

What is claimed is:

1. A magnetic memory device, comprising:
a magnetic recording medium with a recording film having three or more layers in which information is recorded; and
a magnetic head including a recording magnetic pole generating a recording magnetic field for writing information in the magnetic recording medium, an opposed magnetic pole provided facing the recoding magnetic pole, a high frequency magnetic field generating element provided between the recoding magnetic pole and the opposed magnetic pole, and a magnetic reproduction element reading information from the magnetic recording medium,
wherein an anisotropic field of a first layer which is the closest to the magnetic head in the recording film of the magnetic recording medium is larger than 20 kOe, and
wherein in a position of the magnetic recording medium where information is recorded by a recording magnetic field generated from the recording magnetic pole and a high frequency magnetic field generated from the high frequency magnetic field generating element, when an intensity of the recording magnetic field is Hdc, an angle between the recording magnetic field and a magnetic anisotropic easy axis of the magnetic recording medium is $\phi$, a frequency of the high frequency magnetic field is fac, and a damping coefficient of each layer of the magnetic recording medium is $\alpha$, and an average value of anisotropic fields of the magnetic recording medium is Hk, Hk<3·Hdc when $\alpha$>0.1, fac<40 GHz, and $\phi$<30° or $\phi$>60°, and 2·Hdc<Hk<3·Hdc when $\alpha$>0.1, fac<40 GHz, and 30°<$\phi$<60°.

2. The magnetic memory device according to claim 1, wherein the anisotropic field of the first layer of the recording film is larger than an anisotropic field of a second layer of the recording film which is adjacent to the first layer to be opposite to the magnetic head.

3. The magnetic memory device according to claim 1, wherein an anisotropic field of a third layer of the recording film which is adjacent to the second layer of the recording film to be opposite to the magnetic head is larger than the anisotropic field of the second layer.

4. The magnetic memory device according to claim 1, wherein an anisotropic field of a third layer of the recording film which is adjacent to the second layer of the recording film to be opposite to the magnetic head is smaller than the anisotropic field of the second layer.

5. The magnetic memory device according to claim 1, wherein a cap layer for smoothing a surface of the recording film is formed at the magnetic head side of the first layer of the recording film.

* * * * *